(No Model.)
W. H. WORSWICK.
INCUBATOR.
No. 348,368. Patented Aug. 31, 1886.
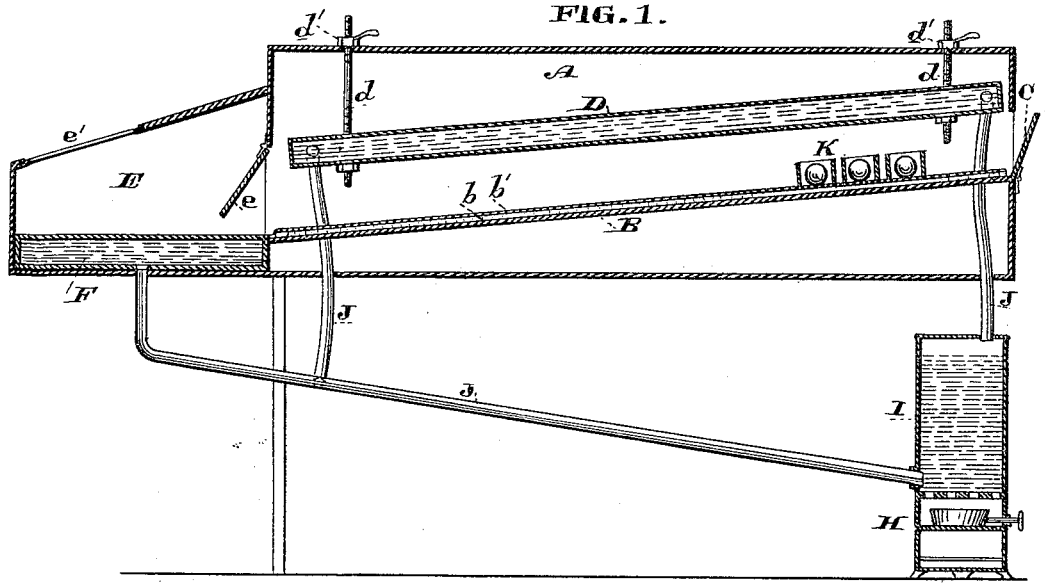
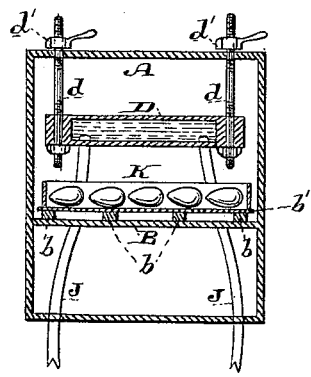
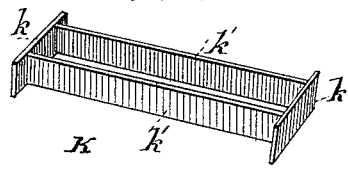
Witnesses,
Geo. H. Strong.
J. H. Nurse
Inventor,
W. H. Worswick
By Dewey & Co.
Att'ys

UNITED STATES PATENT OFFICE.

WILLIAM H. WORSWICK, OF SAN FRANCISCO, CALIFORNIA.

INCUBATOR.

SPECIFICATION forming part of Letters Patent No. 348,368, dated August 31, 1886.

Application filed February 10, 1886. Serial No. 191,509. (No model.)

*To all whom it may concern:*

Be it known that I, WILLIAM H. WORSWICK, of the city and county of San Francisco, and State of California, have invented an Improvement in Incubators; and I hereby declare the following to be a full, clear, and exact description thereof.

My invention relates to the class of incubators; and it consists of an outer shell or casing, having mounted within it an inclined floor with a raised screen-surface, an inclined adjustable water-tank above the floor, and a brooding-chamber at the end of the main chamber, having an underlying water-tank, suitable water-service circulating tubes or pipes connected with the tanks and with the boiler of the heating apparatus, and independent egg-carriers resting upon and adapted to be moved over the screen-surface of the inclined floor, all of which, together with details of construction, I shall hereinafter fully describe.

The object of my invention is to provide a simple and effective incubator which can be continuously operated, and in which there will be no danger of breaking the eggs in moving them.

Referring to the accompanying drawings, Figure 1 is a vertical longitudinal section of my incubator. Fig. 2 is a vertical cross-section of the same. Fig. 3 is a perspective view of one of the egg-carriers.

A is the main casing or shell having within it an inclined floor, B, to which access is had through the swinging glass door C at its upper end. Secured longitudinally upon the inclined floor are a number of strips or ribs, *b*, over which is stretched and secured the screen or netting *b'*. This construction leaves a space under the screen-surface upon which the eggs lie and are moved, thus providing for perfect ventilation.

D is a water-tank having approximately the length and width of the main shell A, and supported at about the inclination of the floor B. The tank is suspended by means of hanger-bolts *d*, and may be vertically adjusted by the lever-nuts *d'* on said bolts. At the end of the main casing is the brooder-chamber E, communicating with the incubating-chamber by a glass door, *e*, and having a glass door, *e'*, on its top for the removal of the chicks when necessary. Under the floor of the brooder-chamber is a water-tank, F. Any suitable source of heat may be employed, though I prefer to use an oil-stove, H, having a boiler, I, into which, as well as the tanks D and F, the water may be introduced in any well-known manner.

J are flexible tubes, preferably of rubber, which communicate with the boiler and with the tanks D and F in such a manner as to provide for the circulation of the water.

K are the egg-carriers. These consist of parallel side strips, *k*, and transverse-spaced slats *k'*, set on edge. There may be as many of these carriers as desired, and they rest upon the screened surface of the inclined floor.

The operation of my machine is as follows: One or more of the carriers K are placed upon the inclined floor B at its upper end, and as many eggs as the carriers have capacity for are placed between their slats. At a stated interval—say in twelve or twenty-four hours—the carriers already in the machine are pushed down by hand along the inclined floor, and as the eggs lie loosely between the slats and rest upon the floor the downward movement or progression of the carriers serves to turn the eggs. Fresh carriers with fresh eggs are placed in the position from which the carriers of the day previous had been pushed, and the operation is continued. At the expiration of the interval fresh carriers with fresh eggs are again placed at the head of the inclined floor, the previous carriers with their eggs being pushed down one stage farther on the floor, and thus the operation is continued until the first carriers have reached the bottom of the inclined floor, the time being so regulated that the chicks will be hatched and pass into the brooder. The carriers thus freed may be removed and used over again at the head of the machine; and thus it will be seen that the entire operation is a continuous one, and may be kept up indefinitely.

I am aware that a machine has been patented in which an endless periodically-moving carrier consisting of spaced slats has been employed, and that in said machine the eggs are turned by the progression of said carrier over an inclined floor, and I do not therefore claim such a feature as my invention; but it will be observed that the carrier to which I refer is a single complete device, while I make use of a number of independent carriers, and move them through a single inclined course by hand. This difference results in many advantages, the chief of which are simplicity and economy. My carriers can also be kept clean, and can be adapted for different sizes of eggs by simply increasing the distance between the slats, and, moreover, by thus positively moving them there is less danger of breaking the eggs in their progression, especially as they have to turn no angles or corners.

The space under the screen $b'$ acts as an air-space, and the heat is entirely from above. The tank D can be readily removed when desired.

Having thus described my invention, what I claim as new, and desire to secure by Letters Patent, is—

1. In an incubator, the combination of a floor and a heater above with the independent egg-carriers resting and adapted to be moved over the floor, and consisting of parallel side strips and intervening spaced slats between which the eggs lie while resting on the floor, substantially as described.

2. In an incubator, an inclined floor, B, communicating at its upper end with an entrance or feed door and a heater above said floor, in combination with the independent egg-carriers on said floor, and consisting of parallel side strips and intervening spaced slots, substantially as described.

3. In an incubator, the inclined floor B, the screen or netting $b'$, supported above it and leaving an air-space, as described, and the heater D above, in combination with the independent slatted egg-carriers K, between the slats of which the eggs lie while resting on the screen, substantially as described.

4. In an incubator, the inclined floor B, having the longitudinal ribs $b$ upon its upper surface, the screen or netting $b'$, secured on the ribs, and the heater D above, in combination with the independent egg-carriers K upon the screen, and consisting of parallel side strips and intervening spaced slats, substantially as described.

5. In an incubator, the combination of the main casing A, the inclined floor B, having a raised screen-surface, the adjustable water-tank D above the floor, the independent slatted egg-carriers K, as described, and the water-circulating pipes J, from the source of heat to the tank D, substantially as described.

6. An incubator comprising the main casing A, having a door, C, in one end and a door, $e$, in the other, the chamber E, communicating with said casing by door $e$, the inclined floor B in the casing having a raised screen-surface, the water-tank D in the casing above the floor, the water-tank F under chamber E, the circulating-pipes J, connecting the tanks with the source of heat, and the independent egg-carriers K, consisting of parallel side strips and intervening spaced slats, all arranged and adapted to operate substantially as described.

In witness whereof I have hereunto set my hand.

WILLIAM H. WORSWICK.

Witnesses:
S. H. NOURSE,
C. D. COLE.